(12) United States Patent
Thomas

(10) Patent No.: US 12,239,501 B2
(45) Date of Patent: Mar. 4, 2025

(54) DENTAL VALVE TAILPIECE

(71) Applicant: Stoma Ventures, LLC, Chesterfield, MO (US)

(72) Inventor: Charles Thomas, Vero Beach, FL (US)

(73) Assignee: STOMA VENTURES, LLC, Chesterfield, MO (US)

( * ) Notice: Subject to any disclaimer, the term of this patent is extended or adjusted under 35 U.S.C. 154(b) by 252 days.

(21) Appl. No.: 16/542,009

(22) Filed: Aug. 15, 2019

(65) Prior Publication Data
US 2021/0045856 A1 Feb. 18, 2021

(51) Int. Cl.
*A61C 17/08* (2006.01)
*A61C 1/00* (2006.01)
*A61C 17/12* (2006.01)

(52) U.S. Cl.
CPC .......... *A61C 17/08* (2019.05); *A61C 1/0061* (2013.01); *A61C 17/12* (2019.05)

(58) Field of Classification Search
CPC ....... A61C 1/0061; A61C 17/06; A61C 17/08; A61C 17/12; A61C 17/125
See application file for complete search history.

(56) References Cited

U.S. PATENT DOCUMENTS

| | | | | |
|---|---|---|---|---|
| 3,516,160 A * | 6/1970 | Leffler | | A61C 17/08 433/95 |
| 4,083,115 A * | 4/1978 | McKelvey | | A61C 17/08 433/96 |
| 4,787,599 A * | 11/1988 | Nyboer | | A61C 17/13 604/902 |
| 4,797,098 A * | 1/1989 | Kawata | | A61C 1/052 433/101 |
| 5,195,952 A * | 3/1993 | Solnit | | A61C 17/08 604/19 |
| 5,295,830 A * | 3/1994 | Shen | | A61C 17/08 433/116 |
| 5,413,142 A * | 5/1995 | Johnson | | A61F 7/10 137/515.5 |
| 5,464,350 A | 11/1995 | Bierbaum | | |
| 5,725,374 A | 3/1998 | Young | | |
| 6,203,321 B1 | 3/2001 | Helmer et al. | | |
| 8,256,464 B2 | 9/2012 | Bushman et al. | | |
| 8,763,638 B2 | 7/2014 | Deubler | | |
| 9,044,294 B1 * | 6/2015 | Herdocia | | A61C 17/08 |
| 2003/0219696 A1 | 11/2003 | Moreland | | |
| 2008/0289696 A1 | 11/2008 | Bushman | | |
| 2010/0297577 A1 * | 11/2010 | Cohen | | A61C 17/065 433/92 |
| 2012/0305100 A1 | 12/2012 | Bushman et al. | | |
| 2017/0120036 A1 * | 5/2017 | Thomas | | F16K 15/144 |

* cited by examiner

*Primary Examiner* — Edward Moran
(74) *Attorney, Agent, or Firm* — David H. Chervitz

(57) ABSTRACT

A tailpiece for a dental valve device is disclosed which has a body having a valve receiving end, a hose receiving end, and an intermediate elbow portion between the valve receiving end and the hose receiving end. A tailpiece for a dental valve device is also disclosed which has a body having a valve receiving end, a hose receiving end, an intermediate elbow portion between the valve receiving end and the hose receiving end, a lumen formed in the body between the valve receiving end and the hose receiving end, and a check valve positioned in the lumen.

12 Claims, 7 Drawing Sheets

DENTAL VALVE TAILPIECE

BACKGROUND

This disclosure relates to a tailpiece for a dental instrument and more particularly to a tailpiece used in conjunction with a dental valve device for a high volume evacuator or a low volume evacuator (saliva ejector).

During a dental procedure it is important to be able to remove saliva, blood, tooth fragments, metals, and other debris from the mouth of a patient. Removal of this matter allows a dentist to be able to perform a procedure in an unobstructed manner. Various systems or devices have been developed to remove liquid and solid materials from a mouth of a patient during a dental procedure. One device that is capable of removing saliva is known as a saliva ejector. A saliva ejector typically comprises a plastic flexible tube or tip for placement in the mouth of the patient. The saliva ejector tip is connected to a valve and the valve is connected to a hose. The hose is connected to a source of vacuum. In this manner, saliva is passed through the ejector tip and the valve to be disposed of in a sanitary manner. Once the procedure is completed, the ejector tip should be discarded and the valve should be replaced. The used valve should also be sterilized by autoclaving to be used again. Although it is suggested to autoclave the valve after use, it is known that autoclaving is hardly ever done. Another device that is capable of removing solid materials is a high volume evacuator system. A high volume evacuator system generally consists of a tube or tip that may be inserted into a mouth of a patient with the tube connected to a valve which is connected to a tailpiece with the tailpiece being connected to a hose or tubing that is in fluid communication with a source of vacuum. Again, in this manner, debris may be removed from the mouth of the patient. After the dental procedure, the tip is disposed of and the valve should be replaced. The used valve should also be sterilized by autoclaving to be used again. However, although it is suggested to sterilize the valve after use, it is known that this suggested procedure is hardly ever followed. As can be appreciated, the saliva ejector and the high volume evacuator are used to remove liquids and debris from a mouth of a patient to prevent a patient from swallowing or aspirating liquids and debris produced during a dental procedure.

As indicated, the high volume evacuator dental valve is connected to the suction hose by use of a tailpiece. The tailpiece typically has a proximal end for allowing the hose to be inserted thereon. The proximal end has either a series of barbs or screw threads for capturing the hose and holding the hose in place or provisions for an O-ring that mates with a coupling associated with the hosing. Positioning the hose over the barbs or threads requires that care be taken so as not to tear or damage the hose. The barbs or threads have sharp edges and inserting or removing the hose may damage the hose.

Although these tailpieces and dental systems are beneficial, one disadvantage associated with their use is that the tailpiece is a straight device. Because of this, users of the tailpiece complain that the tip, valve, tailpiece, and hosing are difficult to move or maneuver during a dental procedure. Further, due to the tailpiece being straight, this leads to fatigue during the dental procedure when the user of the tailpiece has to handle the tailpiece for extended periods of time.

Therefore, it would be desirable to have a tailpiece for a dental valve that is angled so that the tailpiece is more ergonomic and reduces fatigue during use. It would also be desirable to have a tailpiece that is angled for easier use of the dental valve during the dental procedure.

BRIEF SUMMARY

In one form of the present disclosure, a tailpiece for a dental valve device comprises a body having a valve receiving end, a hose receiving end, and an intermediate elbow portion between the valve receiving end and the hose receiving end.

In another form of the present disclosure, a tailpiece for a dental valve device comprises a body having a valve receiving end, a hose receiving end, an intermediate elbow portion between the valve receiving end and the hose receiving end, a lumen formed in the body between the valve receiving end and the hose receiving end, and a check valve positioned in the lumen.

In yet another form of the present disclosure, a tailpiece for a dental valve device comprises a body having a valve receiving end, a hose receiving end having a circular groove, an intermediate elbow portion between the valve receiving end and the hose receiving end, a lumen formed in the body between the valve receiving end and the hose receiving end, and a check valve positioned in the lumen.

In still another form of the present disclosure, a tailpiece for a dental valve device comprises a first tailpiece portion having a body having a valve receiving end, a second tailpiece receiving end, an intermediate elbow portion between the valve receiving end and the second tailpiece receiving end, a lumen formed in the body between the valve receiving end and the second tailpiece receiving end, and a check valve positioned in the lumen, and a second tailpiece portion having a body having a first tailpiece receiving end, a hose receiving end, an intermediate elbow portion between the first tailpiece receiving end and the hose receiving end, a lumen formed in the body between the first tailpiece receiving end and the hose receiving end, and a check valve positioned in the lumen.

The present disclosure provides a tailpiece for a dental valve device that is easy to use and reduces fatigue during a dental procedure.

The present disclosure provides a tailpiece for a dental valve device that is easy to install on a hose connected to a source of vacuum and on to the dental valve device.

The present disclosure provides a tailpiece for a dental valve that is small, lightweight, easy to handle, and easy to install.

The present disclosure also provides a tailpiece for a dental valve which is of simple construction and design and which can be easily employed with highly reliable results.

The present disclosure is related to a tailpiece for a dental valve that can be connected to a disposable dental valve device.

The present disclosure provides a tailpiece for a dental valve that may be disposable or used for a single dental procedure.

The present disclosure is related to a tailpiece for a dental valve device that may be used during a dental operation to assist in removing debris and liquid from an operating site.

The present disclosure also provides a tailpiece for a dental valve that is constructed of readily available materials for the tailpiece to be used for single use or to be disposable.

The present disclosure is also directed to a tailpiece for a dental valve that is angled to provide for better positioning of the dental valve during a dental procedure.

The present disclosure also provides a tailpiece for a dental valve that has a check valve incorporated into the tailpiece which is of simple construction and design and which can be easily employed with highly reliable results.

The present disclosure is also related to a tailpiece for a dental valve that has a check valve incorporated into the tailpiece and does not require sterilization and prevents against any backflow and cross-contamination.

The present disclosure provides a tailpiece for a dental valve that has a check valve incorporated into the tailpiece and the tailpiece may have an antimicrobial agent or chemical incorporated into the tailpiece to prevent any bacterial growth on the device.

The present disclosure is related to a tailpiece for a dental valve that has a check valve incorporated into the tailpiece and the tailpiece may be constructed of plastic that is recyclable or biodegradable to reduce the cost of the tailpiece and to allow the tailpiece to be disposable and discarded after a single use.

The present disclosure also provides a tailpiece for a dental valve that has a pair of tailpiece portions that are connected back to back to provide a more comfortable tailpiece.

The present disclosure is also directed to a tailpiece for a dental valve that provides a different angle for improved use and comfort in using the dental valve.

These and other advantages of the present disclosure will become apparent after considering the following detailed specification in conjunction with the accompanying drawings, wherein:

DETAILED DESCRIPTION OF A PREFERRED EMBODIMENT

Figure 1:
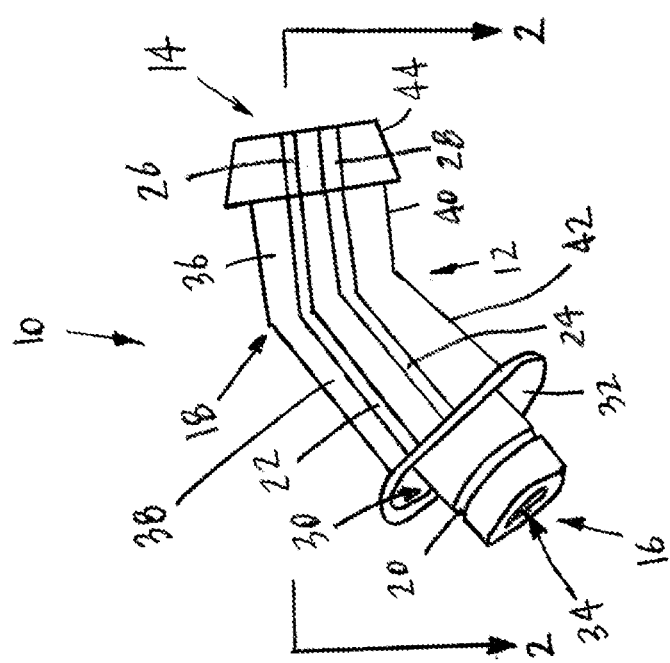
FIG. 1 is a perspective view of a tailpiece for a dental valve device constructed according to the present disclosure.

Referring now to the drawings, wherein like numbers refer to like items, number 10 identifies a tailpiece for a dental valve device for use with a dental valve constructed according to the present disclosure. With reference now to FIG. 1, the tailpiece 10 comprises a body 12 having a valve receiving or distal end 14, a hose receiving or proximal end 16, and an intermediate elbow portion 18 between the valve receiving end 14 and the hose receiving end 16. The valve receiving end 14 is adapted to receive a dental valve (not shown) with the valve adapted to receive an evacuator tip device (not shown) such as a high volume evacuator that is used during a dental operation or procedure. The hose receiving end 16 is adapted to receive a vacuum line or a hose (not shown) which is connected to a suction system (also not shown). The hose receiving end 16 has a circular groove 20 that is adapted for receiving an O-ring (not shown) that is used to mate with a coupler (not shown) associated with the hose. The body 12 may have reinforcing ribs 22 and 24 to add strength to the body 12. The ribs 22 and 24 are also angled at the intermediate elbow portion 18. The valve receiving end 14 may also have reinforcing ribs 26 and 28. Although a pair of ribs 22 and 24 and 26 and 28 are illustrated, it should be understood that more ribs may be provided or positioned around the body 12 and the end 14. The hose receiving end 16 also has an integral circular stop 30 which presents a surface 32 against which a hose may be positioned. A lumen or passageway 34 is also formed within the body 12 between the valve receiving end 14 and the hose receiving end 16. As can be appreciated, the lumen 34 is provided to allow any liquid or debris to flow through the tailpiece 10 during a dental procedure. The body 12 has a first arm portion 36 and a second arm portion 38. The first arm portion 36 and the second arm portion 38 meet at the intermediate elbow portion 18. The first arm portion 36 has a length 40 and the second arm portion 38 has a length 42. The length 40 is less than the length 42 in this particular view. However, it is possible and contemplated that the lengths 40 and 42 may be the same or equal or that the length 40 may be greater than the length 42. The intermediate elbow portion 18 is angled and some dimensions of the angle may be less than ninety degrees. Some possible angles may be thirty degrees or forty-five degrees. The valve receiving end 14 may also have a circular collar 44 which is used to assist in attaching the tailpiece 10 to a dental valve device or a dental valve (not shown).

Figure 2:
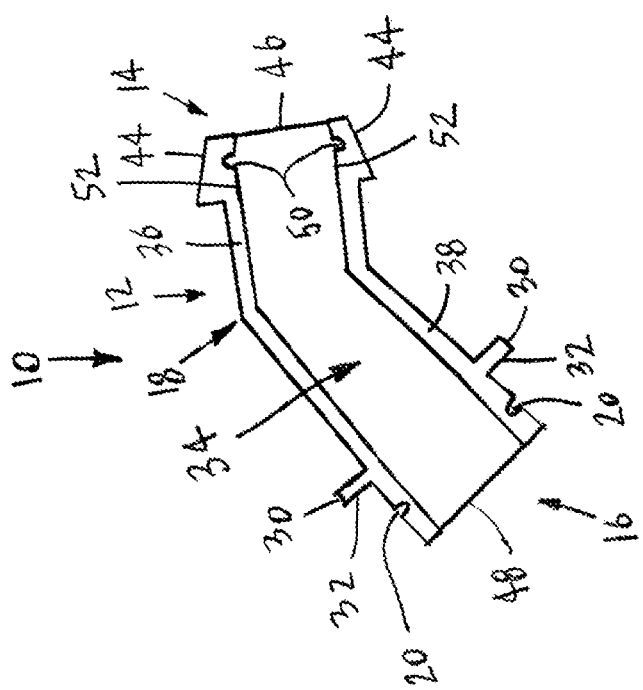
FIG. 2 is a cross-sectional view of the tailpiece for a dental valve device taken along the plane of line 2-2 in FIG. 1.

FIG. 2 is a cross-sectional view of the tailpiece 10 taken along the plane of line 2-2 in FIG. 1. The tailpiece 10 has the body 12 having the valve receiving or distal end 14, the hose receiving or proximal end 16, and the intermediate elbow portion 18 between the valve receiving end 14 and the hose receiving end 16. The valve receiving end 14 has an opening 46 and the hose receiving end 16 has an opening 48. The lumen 34 is defined between the opening 46 and the opening 48 within the body 12. The hose receiving end 16 also has the integral circular stop 30 having the surface 32. The body 12 has the first arm portion 36 and the second arm portion 38. The first arm portion 36 and the second arm portion 38 meet at the intermediate elbow portion 18. The hose receiving end 16 also has the circular groove 20 formed therein. The valve receiving end 14 has a circular groove 50 formed in an interior surface 52 of the lumen 34. The circular groove 50 may be used to capture an O-ring (not shown) associated with a dental valve (not shown), as will be discussed in detail further herein. The valve receiving end 14 also depicts the circular collar 44.

Figure 3:
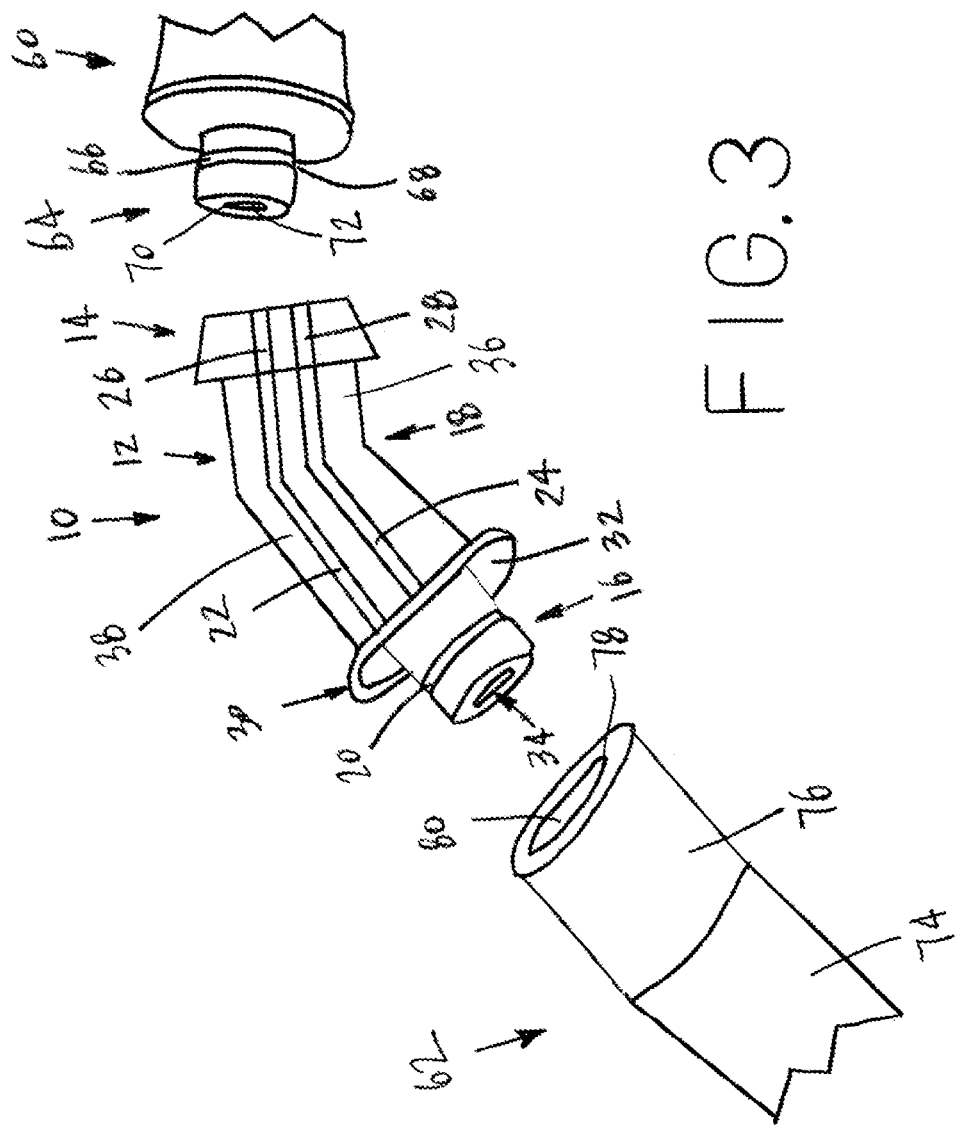
FIG. 3 is a side perspective view the tailpiece for a dental valve device constructed according to the present disclosure shown next to a partial view of a dental valve device and a partial view of a hose.

With reference now to FIG. 3, a side perspective view the tailpiece 10 constructed according to the present disclosure is shown between a partial view of a dental valve 60 and a partial view of a hose 62. The dental valve 60 has a tailpiece receiving end 64 having an O-ring 66 positioned in a circular groove 68 formed in the end 64. The O-ring 66 is used to fit in the circular groove 50 (FIG. 2) of the tailpiece 10. The O-ring 66 assists in securing the dental valve 60 to the tailpiece 10. The tailpiece receiving end 64 also has an opening 70 and a lumen 72. As can be appreciated, any liquid or debris is capable of flowing through the lumen 72 of the dental device 60 through the opening 70 and into the tailpiece 10. The hose 62 has a flexible tubing or hosing 74 and a coupler 76. The coupler 76 has an opening 78 and a lumen 80. Although not shown in this particular view, the lumen 80 has a circular groove having an O-ring therein. The O-ring is received in the circular groove 20 associated with the tailpiece 10. In this manner, when the hose receiving end 16 is inserted into the opening 78 of the coupler 76 the tailpiece 10 will be retained by use of the O-ring.

The tailpiece 10 is shown to have the body 12 having the valve receiving end 14, the hose receiving end 16, and the intermediate elbow portion 18 between the ends 14 and 16. The body 12 has the reinforcing ribs 22 and 24 and the valve receiving end 14 has the reinforcing ribs 26 and 28. The hose receiving end 16 also has the integral circular stop 30 having the surface 32. The lumen 34 is formed within the body 12 between the valve receiving end 14 and the hose receiving end 16. The first arm portion 36 and the second arm portion 38 are shown meeting at the intermediate elbow portion 18.

In operation, of the tailpiece 10, the hose receiving end 16 has the coupler 76 of the hose 62 inserted thereon. The hose 62 is connected to a suction system which generates a vacuum. The dental valve 60 is then inserted into the valve receiving end 14 to be secured in place. An evacuator tip (not shown) is inserted into the dental valve 60 and then placed in a mouth of a dental patient during a dental procedure or operation to remove debris or fluids from the mouth of the dental patient. Once the dental valve 60 is operated or opened air is allowed to flow through the evacuator tip, the dental valve 60, the lumen 34 of the tailpiece 10, the hose 62 and into a suction system. When suction is not needed during the dental procedure, the dental valve 60 is closed. Further, once a dental procedure has been completed, the evacuator tip, the dental valve 60, and the tailpiece 10 may be discarded. As can be appreciated, the intermediate elbow portion 18 angles the tailpiece 10 to provide for a more comfortable positioning of the dental valve 60 during use.

Figure 4:
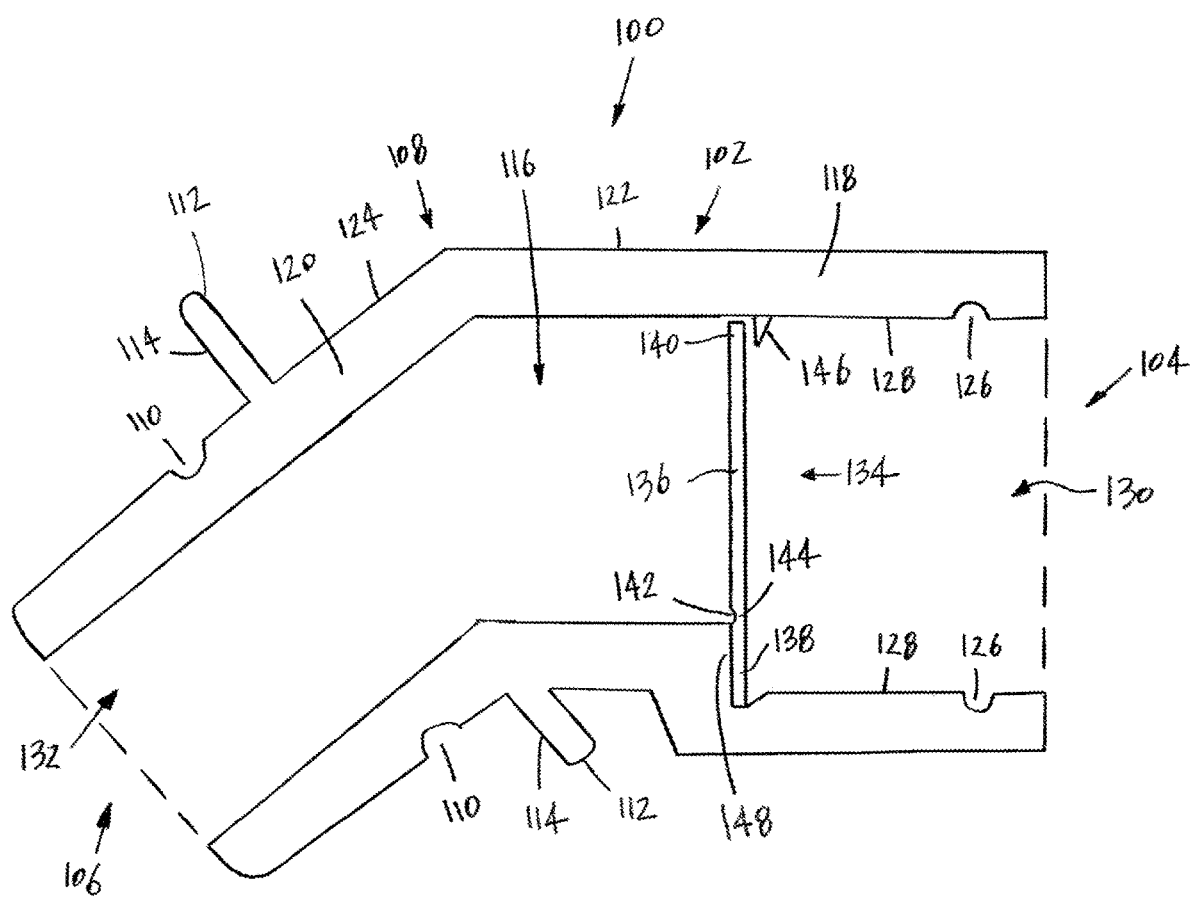
FIG. 4 is a cross-sectional view of another embodiment of a tailpiece for a dental valve device constructed according to the present disclosure.

FIG. 4 illustrates a cross-sectional view of another embodiment of a tailpiece 100 constructed according to the present disclosure. The tailpiece 100 comprises a body 102 having a valve receiving or distal end 104, a hose receiving or proximal end 106, and an intermediate elbow portion 108 between the valve receiving end 104 and the hose receiving end 106. The valve receiving end 104 is adapted to receive a dental valve, such as the dental valve 60 of FIG. 3, with the dental valve 60 adapted to receive an evacuator tip device (not shown) such as a high volume evacuator that is used during a dental operation or procedure. The hose receiving end 106 is adapted to receive the hose, such as the hose 62 of FIG. 3, which is connected to a suction system (not shown). The hose receiving end 106 has a circular groove 110 that is adapted to receive the O-ring (not shown) associated with the coupler 76 (FIG. 3). The hose receiving end 106 also has an integral circular stop 112 which presents a surface 114 against which the coupler 76 may be positioned. A lumen or passageway 116 is also formed within the body 102 between the valve receiving end 104 and the hose receiving end 106. As can be appreciated, the lumen 116 is provided to allow any liquid or debris to flow through the tailpiece 100 during a dental procedure. The body 102 has a first arm portion 118 and a second arm portion 120. The first arm portion 118 and the second arm portion 120 meet at the intermediate elbow portion 108. The first arm portion 118 has a length 122 and the second arm portion 120 has a length 124. The length 122, in this particular embodiment, is greater than the length 124. However, it is possible and contemplated that the lengths 122 and 124 may be the same or equal or that the length 122 may be less than the length 124. The intermediate elbow portion 108 is angled and some dimensions of the angle may be less than ninety degrees. Some possible angles may be thirty degrees or forty-five degrees. The valve receiving end 104 has a circular groove 126 formed in an interior surface 128 of the tailpiece 100. The circular groove 126 is used to capture or retain the O-ring 66 (FIG. 3) of the dental valve 60 (FIG. 3). The valve receiving end 104 has an opening 130 and the hose receiving end 106 has an opening 132. The lumen 116 is defined between the opening 130 and the opening 132 within the body 102. Although not shown, it is possible that the tailpiece 100 may incorporate reinforcing ribs and/or a collar.

The tailpiece 100 has a check valve 134 positioned within the lumen 116 to selectively open or close the tailpiece 100. The check valve 134 is provided for allowing liquid, blood, saliva, or debris to pass from the tip receiving end 104, the check valve 134, and out the hose receiving end 106 when the check valve 134 is opened. However, the check valve 134 also prevents any liquid, blood, saliva, or debris from passing or traveling from the hose receiving end 106, by the check valve 134, and out through the valve receiving end 104 when the check valve 134 is closed. The check valve 134 will close when a reduced pressure occurs from an interaction of a mouth of a patient on an evacuator tip device. For example, a patient may be requested to close the mouth of the patient around the evacuator tip device. When this occurs, a reduced pressure results in which a backflow may occur. The check valve 134 is sensitive to this pressure differential and will close to prevent backflow. The check valve 134 is shown in the closed position in FIG. 4. The check valve 134 comprises a flap portion 136 having a lower end 138 and an upper end 140. The lower end 138 is secured to the interior surface 128. The lower end 138 also has a cutout portion 142 that forms a hinge 144 that allows the check valve 134 to move from the shown closed position to an opened position. A seat portion or stop element 146 is positioned near the upper end 140 and the stop element 146 prevents the check valve 134 from opening during a reduced pressure condition. The upper end 140 of the flap portion 136 seals against the stop element 146 when the check valve 134 is in the closed position. The lower end 138 is adjacent to a lower seat portion 148. The lower seat portion 148 may reduced the diameter of the lumen 116. As should be appreciated, a major difference from the tailpiece 100 and the tailpiece 10 is the incorporation of the check valve 134 in the tailpiece 100.

In operation of the tailpiece 100, the hose receiving end 106 of the tailpiece 100 is placed on to the coupler 76 of the hose 62 with the hose 62 being connected to a suction system (not shown). The valve receiving end 104 is attached to the dental valve 60 which has an evacuator tip (not shown) connected thereto to be placed in a mouth of a dental patient. The dental valve 60 is opened and air is allowed to flow through the tip, the dental valve, the tailpiece 100 and the check valve 134, the hose 62, and then into a suction system. In the event that reduced pressure occurs from an interaction of a mouth of a patient on an evacuator tip device, the check valve 134 will close and no backflow will be allowed from the suction system, the hose 62, the tailpiece 100, or the dental valve 60. Once a dental procedure has been completed, the dental valve 60 and the tailpiece 100 may be disposed of by any suitable manner. A new tailpiece 100 may then connected to the hose 62.

Figure 5:
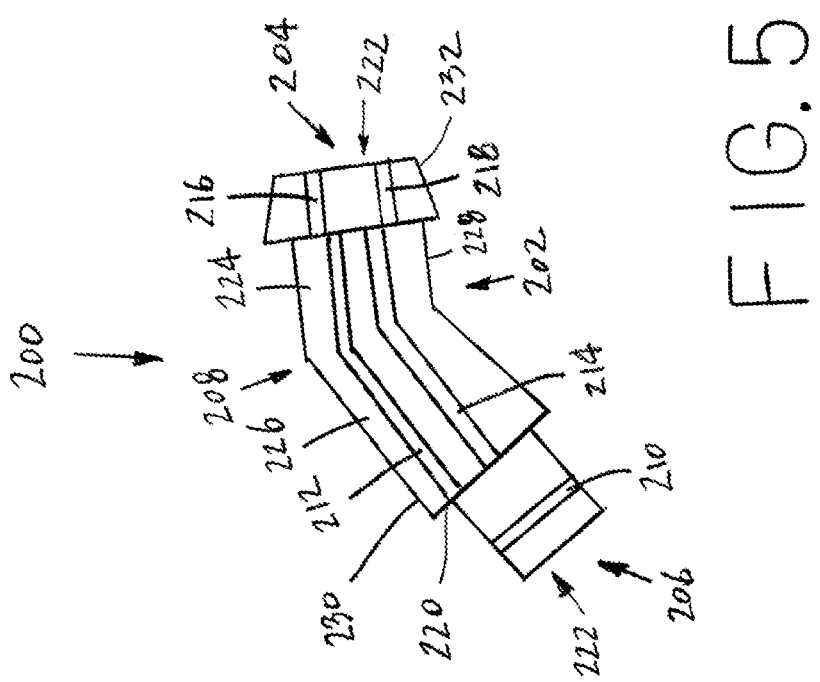
FIG. 5 is a perspective view of another embodiment of a tailpiece for a dental valve device constructed according to the present disclosure (without stop plate)

With particular reference now to FIG. 5, another embodiment of a tailpiece 200 is shown constructed according to the present disclosure. The tailpiece 200 comprises a body 202 having a valve receiving or distal end 204, a hose receiving or proximal end 206, and an intermediate elbow portion 208 between the valve receiving end 204 and the hose receiving end 206. The valve receiving end 204 is adapted to receive a dental valve (not shown) with the valve adapted to receive an evacuator tip device (not shown) such as a high volume evacuator that is used during a dental operation or procedure. The hose receiving end 206 is adapted to receive a vacuum line or a hose (not shown) which is connected to a suction system (also not shown). The hose receiving end 206 has a circular groove 210 that is adapted for receiving an O-ring (not shown) that is used to mate with a coupler (not shown) associated with the hose. The body 202 may have reinforcing ribs 212 and 214 to add strength to the body 202. The ribs 212 and 214 are also angled at the intermediate elbow portion 208. The valve receiving end 204 may also have reinforcing ribs 216 and 218. Although a pair of ribs 212 and 214 and 216 and 218 are illustrated, it should be understood that more ribs may be provided or positioned around the body 202 and the end 204. The hose receiving end 206 also has a circular stop surface 220 against which a hose may be positioned. A lumen or passageway 222 is also formed within the body 202 between the valve receiving end 204 and the hose receiving end 206. As can be appreciated, the lumen 222 is provided to allow any liquid or debris to flow through the tailpiece 10 during a dental procedure. The body 202 has a first arm portion 224 and a second arm portion 226. The first arm portion 224 and the second arm portion 226 meet at the intermediate elbow portion 208. The first arm portion 224 has a length 228 and the second arm portion 226 has a length 230. The length 228 is less than the length 230 in this particular view. However, it is possible and contemplated that the lengths 228 and 230 may be the same or equal or that the length 228 may be greater than the length 230. The intermediate elbow portion 208 is angled and some dimensions of the angle may be less than ninety degrees. Some possible angles may be thirty degrees or forty-five degrees. The valve receiving end 204 may also have a circular collar 232 which is used to assist in attaching the tailpiece 200 to a dental valve (not shown). Although not shown, the check valve 134 may be incorporated into the tailpiece 200. A major difference from the tailpieces 10 and 100 and the tailpiece 200 is that the tailpiece 200 does not have the integral circular stop 30 or 112 that extends outwardly from the body 12 or 102, respectively.

Figure 6:
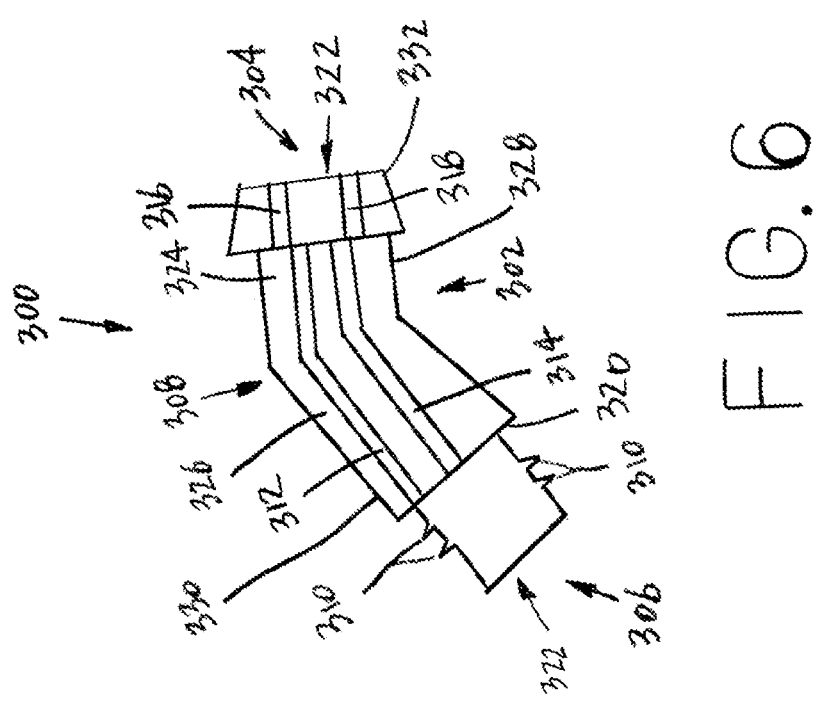
FIG. 6 is a perspective view of another embodiment of a tailpiece for a dental valve device constructed according to the present disclosure (barb end)

FIG. 6 illustrates another embodiment of a tailpiece 300. The tailpiece 300 comprises a body 302 having a valve receiving or distal end 304, a hose receiving or proximal end 306, and an intermediate elbow portion 308 between the valve receiving end 304 and the hose receiving end 306. The valve receiving end 304 is adapted to receive a dental valve (not shown) with the valve adapted to receive an evacuator tip device (not shown) such as a high volume evacuator that is used during a dental operation or procedure. The hose receiving end 306 is adapted to receive a vacuum line or a hose (not shown) which is connected to a suction system (also not shown). The hose receiving end 306 has barbs 310 that are used to secure a hose (not shown) to the tailpiece 300. The body 302 may have reinforcing ribs 312 and 314 to add strength to the body 302. The ribs 312 and 314 are also angled at the intermediate elbow portion 308. The valve receiving end 304 may also have reinforcing ribs 316 and 318. Although a pair of ribs 312 and 314 and 316 and 318 are illustrated, it should be understood that more ribs may be provided or positioned around the body 302 and the end 304. The hose receiving end 306 also has a circular stop surface 320 against which a hose may be positioned. A lumen or passageway 322 is also formed within the body 302 between the valve receiving end 04 and the hose receiving end 206. As can be appreciated, the lumen 322 is provided to allow any liquid or debris to flow through the tailpiece 300 during a dental procedure. The body 302 has a first arm portion 324 and a second arm portion 326. The first arm portion 324 and the second arm portion 326 meet at the intermediate elbow portion 308. The first arm portion 324 has a length 328 and the second arm portion 326 has a length 330. The length 328 is less than the length 330 in this particular view. However, it is possible and contemplated that the lengths 328 and 330 may be the same or equal or that the length 328 may be greater than the length 330. The intermediate elbow portion 308 is angled and some dimensions of the angle may be less than ninety degrees. Some possible angles may be thirty degrees or forty-five degrees. The valve receiving end 304 may also have a circular collar 332 which is used to assist in attaching the tailpiece 300 to a dental valve (not shown). Although not shown, the check valve 134 may be incorporated into the tailpiece 300. A major difference from the tailpieces 10, 100, and 200 and the tailpiece 300 is that the tailpiece 300 has the barbs 310.

Figure 7:
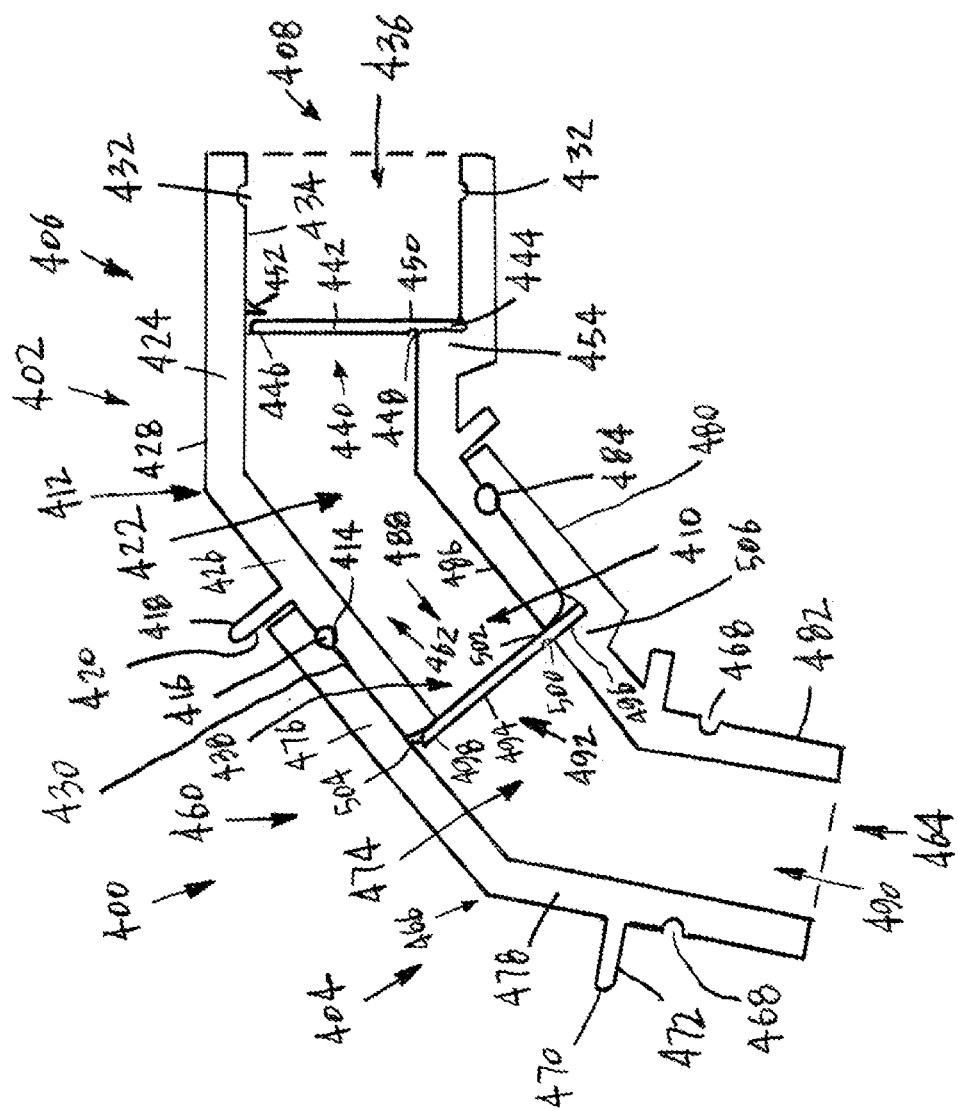
FIG. 7 is a cross-sectional view of another embodiment of a tailpiece for a dental valve device constructed according to the present disclosure.

With particular reference now to FIG. 7, another embodiment of a tailpiece 400 constructed according to the present disclosure is illustrated in cross-section. The tail piece 400 comprises a pair of tailpiece portions or a first tailpiece portion 402 and a second tailpiece portion 404 connected back to back to provide a different angle than the angles provided by the tailpieces 10, 100, 200, or 300. The tailpiece 400 may be used for better comfort for a user of the tailpiece 400. The first tailpiece portion 402 comprises a body 406 having a valve receiving or distal end 408, a second tailpiece receiving or proximal end 410, and an intermediate elbow portion 412 between the valve receiving end 408 and the second tailpiece receiving end 410. The valve receiving end 408 is adapted to receive a dental valve, such as the dental valve 60 of FIG. 3, with the dental valve 60 adapted to receive an evacuator tip device (not shown) such as a high volume evacuator that is used during a dental operation or procedure. The second tailpiece receiving end 410 has a circular groove 414 that is adapted to receive an O-ring 416 associated with the second tailpiece portion 404, as will be explained. The second tailpiece receiving end 410 also has an integral circular stop 418 which presents a surface 420 against which the second tailpiece 404 may be positioned. A lumen or passageway 422 is also formed within the body 406 between the valve receiving end 408 and the second tailpiece receiving end 410. As can be appreciated, the lumen 422 is provided to allow any liquid or debris to flow through the tailpiece portion 402 during a dental procedure. The body 406 has a first arm portion 424 and a second arm portion 426. The first arm portion 424 and the second arm portion 426 meet at the intermediate elbow portion 412. The first arm portion 424 has a length 428 and the second arm portion 426 has a length 430. The length 428, in this particular embodiment, is greater than the length 430. However, it is possible and contemplated that the lengths 428 and 430 may be the same or equal or that the length 428 may be less than the length 430. The intermediate elbow portion 412 is angled and some dimensions of the angle may be less than ninety degrees. Some possible angles may be thirty degrees or forty-five degrees. The valve receiving end 408 has a circular groove 432 formed in an interior surface 434 of the first tailpiece portion 402. The circular groove 432 is used to capture or retain the O-ring 66 (FIG. 3) of the dental valve 60 (FIG. 3). The valve receiving end 408 has an opening 436 and the second tailpiece receiving end 410 has an opening 438. The lumen 422 is defined between the opening 436 and the opening 438 within the body 406. Although not shown, it is possible that the first tailpiece portion 402 may incorporate reinforcing ribs and/or a collar.

The first tailpiece portion 402 has a check valve 440 positioned within the lumen 422 to selectively open or close the first tailpiece portion 402. The check valve 440 is provided for allowing liquid, blood, saliva, or debris to pass from the valve receiving end 408, the check valve 440, and out the second tailpiece receiving end 410 when the check valve 440 is opened. However, the check valve 440 also prevents any liquid, blood, saliva, or debris from passing or traveling from the second tailpiece receiving end 410, by the check valve 440, and out through the valve receiving end 408 when the check valve 440 is closed. The check valve 440 will close when a reduced pressure occurs from an interaction of a mouth of a patient. For example, a patient may be requested to close the mouth of the patient around an evacuator tip device (not shown). When this occurs, a reduced pressure results in which a backflow may occur. The check valve 440 is sensitive to this pressure differential and will close to prevent backflow. The check valve 440 is shown in the closed position in FIG. 7. The check valve 440 comprises a flap portion 442 having a lower end 444 and an upper end 446. The lower end 444 is secured to the interior surface 434. The lower end 444 also has a cutout portion 448 that forms a hinge 450 that allows the check valve 440 to move from the shown closed position to an opened position. A seat portion or stop element 452 is positioned near the upper end 446 and the stop element 452 prevents the check valve 440 from opening during a reduced pressure condition. The upper end 446 of the flap portion 442 seals against the stop element 452 when the check valve 440 is in the closed position. The lower end 444 is adjacent to a lower seat portion 454. The lower seat portion 454 may reduce or step down the diameter of the lumen 422.

The second tailpiece portion 404 comprises a body 460 having a first tailpiece receiving or distal end 462, a hose receiving or proximal end 464, and an intermediate elbow portion 466 between the first tailpiece receiving end 462 and the hose receiving end 464. The first tailpiece receiving end 462 is adapted to receive the second tailpiece receiving end 410 of the first tailpiece portion 402. The hose receiving end 464 has a circular groove 468 that is adapted to receive the O-ring (not shown) associated with the coupler 76 (FIG. 3). The hose receiving end 464 also has an integral circular stop 470 which presents a surface 472 against which the coupler 76 (FIG. 3) may be positioned. A lumen or passageway 474 is also formed within the body 460 between the first tailpiece receiving end 462 and the hose receiving end 464. As can be appreciated, the lumen 474 is provided to allow any liquid or debris to flow through the second tailpiece portion 404 during a dental procedure. The body 460 has a first arm portion 476 and a second arm portion 478. The first arm portion 476 and the second arm portion 478 meet at the intermediate elbow portion 466. The first arm portion 476 has a length 480 and the second arm portion 478 has a length 482. The length 480, in this particular embodiment, is greater than the length 482. However, it is possible and contemplated that the lengths 480 and 482 may be the same or equal or that the length 480 may be less than the length 482. The intermediate elbow portion 466 is angled and some dimensions of the angle may be less than ninety degrees. Some possible angles may be thirty degrees or forty-five degrees. The first tailpiece receiving end 462 has a circular groove 484 formed in an interior surface 486 of the second tailpiece portion 404. The circular groove 484 is used to capture or retain the O-ring 416. The first tailpiece receiving end 462 has an opening 488 and the hose receiving end 464 has an opening 490. The lumen 474 is defined between the opening 488 and the opening 490 within the body 460. Although not shown, it is possible that the second tailpiece portion 404 may incorporate reinforcing ribs and/or a collar.

The second tailpiece portion 404 has a check valve 492 positioned within the lumen 474 to selectively open or close the second tailpiece portion 404. The check valve 490 is provided for allowing liquid, blood, saliva, or debris to pass from the first tailpiece receiving end 462, the check valve 492, and out the hose receiving end 464 when the check valve 492 is opened. However, the check valve 492 also prevents any liquid, blood, saliva, or debris from passing or traveling from the hose receiving end 464, by the check valve 492, and out through the first tailpiece receiving end 462 when the check valve 492 is closed. The check valve 492 will close when a reduced pressure occurs from an interaction of a mouth of a patient. For example, a patient may be requested to close the mouth of the patient around an evacuator tip device (not shown). When this occurs, a reduced pressure results in which a backflow may occur. The check valve 492 is sensitive to this pressure differential and will close to prevent backflow. The check valve 492 is shown in the closed position in FIG. 7. The check valve 492 comprises a flap portion 494 having a lower end 496 and an upper end 498. The lower end 496 is secured to the interior surface 486. The lower end 496 also has a cutout portion 500 that forms a hinge 502 that allows the check valve 492 to move from the shown closed position to an opened position. A seat portion or stop element 504 is positioned near the upper end 498 and the stop element 504 prevents the check valve 492 from opening during a reduced pressure condition. The upper end 498 of the flap portion 494 seals against the stop element 504 when the check valve 492 is in the closed position. The lower end 496 is adjacent to a lower seat portion 506. The lower seat portion 506 may reduce or step down the diameter of the lumen 474. Although the tailpiece 400 has been shown and described with each of the portions 402 and 404 having a check valve 440 and 492, respectively, it is also possible and contemplated that only one of the check valves 440 or 492 may be required or used. It is also possible that neither of the check valves 440 or 492 may be required.

The tailpieces 10, 100, 200, 300, and 400 may be formed of any suitable material such as metal, plastic, polyethylene, and high density polyethylene or any other suitable material. Any suitable material may be used to construct the tailpieces 10, 100, 200, 300, and 400 so that the tailpieces 10, 100, 200, 300, and 400 may withstand use in a dental operation or procedure. It is also possible and contemplated to incorporate an antimicrobial agent or chemical in the plastic or to provide a coating of an antimicrobial agent on the plastic to further prevent cross-contamination when using the tailpieces 10, 100, 200, and 300 during a dental operation or procedure.

From all that has been said, it will be clear that there has thus been shown and described herein a tailpiece for a dental valve device which fulfills the various advantages sought therefore. It will become apparent to those skilled in the art, however, that many changes, modifications, variations, and other uses and applications of the subject tailpiece for a dental valve device are possible and contemplated. All changes, modifications, variations, and other uses and applications which do not depart from the spirit and scope of the disclosure are deemed to be covered by the disclosure, which is limited only by the claims which follow.

What is claimed is:

1. A tailpiece for a dental valve device, the tailpiece comprising:
   a body having a valve receiving end having a circular collar having a length extending from a first end of the collar closer to the body to a second free end of the collar, a hose receiving end having an integral circular stop, an intermediate elbow portion between the valve receiving end and the hose receiving end, a first arm portion between the valve receiving end and the intermediate elbow portion, a second arm portion between the intermediate elbow portion and the hose receiving end, a first reinforcing rib on the body extending along the body from the valve receiving end to the integral circular stop, and a second reinforcing rib on the circular collar separate from the first reinforcing rib on the body with the second reinforcing rib extending entirely along the length of the circular collar;
   a lumen formed in the body between the valve receiving end and the hose receiving end with the lumen having a lower seat portion in the first arm portion between the valve receiving end and the intermediate elbow portion, and a stop element opposite of the lower seat portion; and
   a check valve positioned in the lumen in the first arm portion, the check valve comprising a flap portion having a lower end and an upper end, the lower end being adjacent to the lower seat portion and the upper end being adjacent to the stop element.

2. The tailpiece for a dental valve device of claim 1 wherein the flap portion further comprises a hinge above the lower end of the flap portion and above the lower seat portion.

3. The tailpiece for a dental valve device of claim 1 wherein the check valve further comprises a cutout portion that forms a hinge that allows the check valve to move from a closed position to an opened position.

4. The tailpiece for a dental valve device of claim 1 wherein the valve receiving end further comprises a circular groove formed in an interior surface of the tailpiece.

5. The tailpiece for a dental valve device of claim 1 wherein the hose receiving end further comprises a circular groove.

6. The tailpiece for a dental valve device of claim 1 wherein the integral circular stop has a surface against which a hose may be positioned.

7. The tailpiece for a dental valve device of claim 1 wherein the body further comprises a third reinforcing rib with the second reinforcing rib on the collar being offset from the third reinforcing rib.

8. A tailpiece for a dental valve device, the tailpiece comprising:
   a body having a valve receiving end having a circular collar having a length extending from a first end closer to the body to a second free end, a hose receiving end having an integral circular stop and a circular groove, an intermediate elbow portion between the valve receiving end and the hose receiving end, a first arm portion between the valve receiving end and the intermediate elbow portion, a second arm portion between the hose receiving end and the intermediate elbow portion, a first reinforcing rib between the valve receiving end and the integral circular stop of the hose receiving end along the first arm portion and the second arm portion and angled at the intermediate elbow portion, and a second reinforcing rib on the circular collar separate from the first reinforcing rib on the body with the second reinforcing rib extending entirely along the length of the circular collar;
   a lumen formed in the body between the valve receiving end and the hose receiving end with the lumen having a lower seat portion in the first arm portion between the valve receiving end and the intermediate elbow portion, and a stop element opposite of the lower seat portion; and
   a check valve positioned in the lumen in the first arm portion, the check valve comprising a flap portion having a lower end and an upper end, the lower end being adjacent to the lower seat portion and the upper end being adjacent to the stop element.

9. The tailpiece for a dental valve device of claim 8 wherein the flap portion further comprises a hinge above the lower end of the flap portion and above the lower seat portion.

10. The tailpiece for a dental valve device of claim 8 wherein the check valve further comprises a cutout portion that forms a hinge that allows the check valve to move from a closed position to an opened position.

11. The tailpiece for a dental valve device of claim 8 wherein the valve receiving end further comprises a circular groove formed in an interior surface of the tailpiece.

12. The tailpiece for a dental valve device of claim 8 wherein the body further comprises a third reinforcing rib with the second reinforcing rib on the collar being offset from the third reinforcing rib.

* * * * *